United States Patent [19]

McCarney et al.

[11] Patent Number: 5,608,381
[45] Date of Patent: Mar. 4, 1997

[54] ANIMAL CONTAINMENT SYSTEM

[75] Inventors: David A. McCarney; Frank A. Calabrese, both of Wayesboro; Kenneth B. Shockey, Greencastle, all of Pa.

[73] Assignee: Industrial Automation Technologies, Inc., Waynesboro, Pa.

[21] Appl. No.: 310,873

[22] Filed: Sep. 23, 1994

Related U.S. Application Data

[63] Continuation-in-part of Ser. No. 126,321, Sep. 24, 1993, abandoned, which is a continuation-in-part of Ser. No. 14,810, Feb. 8, 1993, which is a continuation of Ser. No. 867,892, Apr. 13, 1992, abandoned, which is a continuation-in-part of Ser. No. 94,075, Sep. 4, 1987, Pat. No. 5,113,962, which is a continuation of Ser. No. 820,644, Jan. 21, 1986, abandoned.

[51] Int. Cl.⁶ .................................................. G08B 13/14
[52] U.S. Cl. .............................. 340/573; 119/719
[58] Field of Search .......................... 340/573; 119/720, 119/721, 712, 719

[56] References Cited

U.S. PATENT DOCUMENTS

| | | | |
|---|---|---|---|
| 3,589,337 | 6/1971 | Poss | 119/720 |
| 4,794,402 | 12/1988 | Gowda | 119/720 |
| 4,999,613 | 3/1991 | Williamson | 340/573 |
| 5,054,428 | 10/1991 | Farkus | 340/573 |
| 5,099,797 | 3/1992 | Gowda | 119/720 |
| 5,161,485 | 11/1992 | McDade | 119/720 |
| 5,266,944 | 11/1993 | Carroll | 340/573 |
| 5,272,466 | 12/1993 | Venczel | 340/573 |
| 5,307,763 | 5/1994 | Arthur | 119/719 |
| 5,351,653 | 11/1994 | Marischen | 119/719 |
| 5,353,744 | 10/1991 | Custer | 340/573 |

*Primary Examiner*—Brent A. Swarthout
*Assistant Examiner*—Albert K. Wong
*Attorney, Agent, or Firm*—Spencer T. Smith

[57] ABSTRACT

An animal containment system is disclosed wherein the contained animal wears a receiver which receives first and second codes in the form of frequencies which are defined in adjacent curtains of near infrared or the like light established by a transmitting device. One pair of one shots detects one frequency and a second pair of one shots detects a second frequency. When the warning frequency is detected a sounder continuously operates and when the second frequency is detected a transformer is intermittently operated to shock the animal and the sounder is intermittently operated. The transformer can be operated in three modes: high power, low power or disconnected.

9 Claims, 14 Drawing Sheets

ANIMAL CONTAINMENT SYSTEM

The present application is a continuation in part of Ser. No. 126,321, filed Sep. 24, 1993, abandoned, which was a continuation-in-part of Ser. No. 08/014,810, filed Feb. 8, 1993, which was a continuation of 07/867,892, filed Apr. 13, 1992, abandoned, which was a continuation in part of Ser. No. 07/094,075, now U.S. Pat. No. 5,113,962, which was a continuation of Ser. No. 06/820,644, abandoned.

An animal containment system is disclosed which is a static electronic energy conversion device consisting of two parts, a transmitter part and a receiver part. Being static, it contains no moving parts. A linear energy field of coded energy which may be viewed as a plane or curtain of energy, is transmitted along a linear corridor. The width, length, and even the curvature of this energy curtain may be adjusted to meet specific applications. The energy transmitted in this manner may be received by a receiver located anywhere within the curtain (plane). The strength of the energy will decrease in intensity as the energy field extends from the focal line of the curtain.

Encoded, superimposed or integrated within the energy curtain is a communication signal, which may be a frequency, pulses, modulated frequency, modulated amplitude, etc. The complementary receiver part located anywhere within the curtain (plane) of the transmitted energy will receive the energy, and decode the encoded signal. In this fashion communication will occur between the transmitter(s) and any receiver carried by an animal located within the curtain (plane).

Other objects and advantages of the present invention will become apparent from the following portion of the specification and from the following drawings which illustrate in accordance with the mandate of the patent statues presently preferred embodiment incorporating the principles of the invention.

Referring to the drawings.

Figure 1:
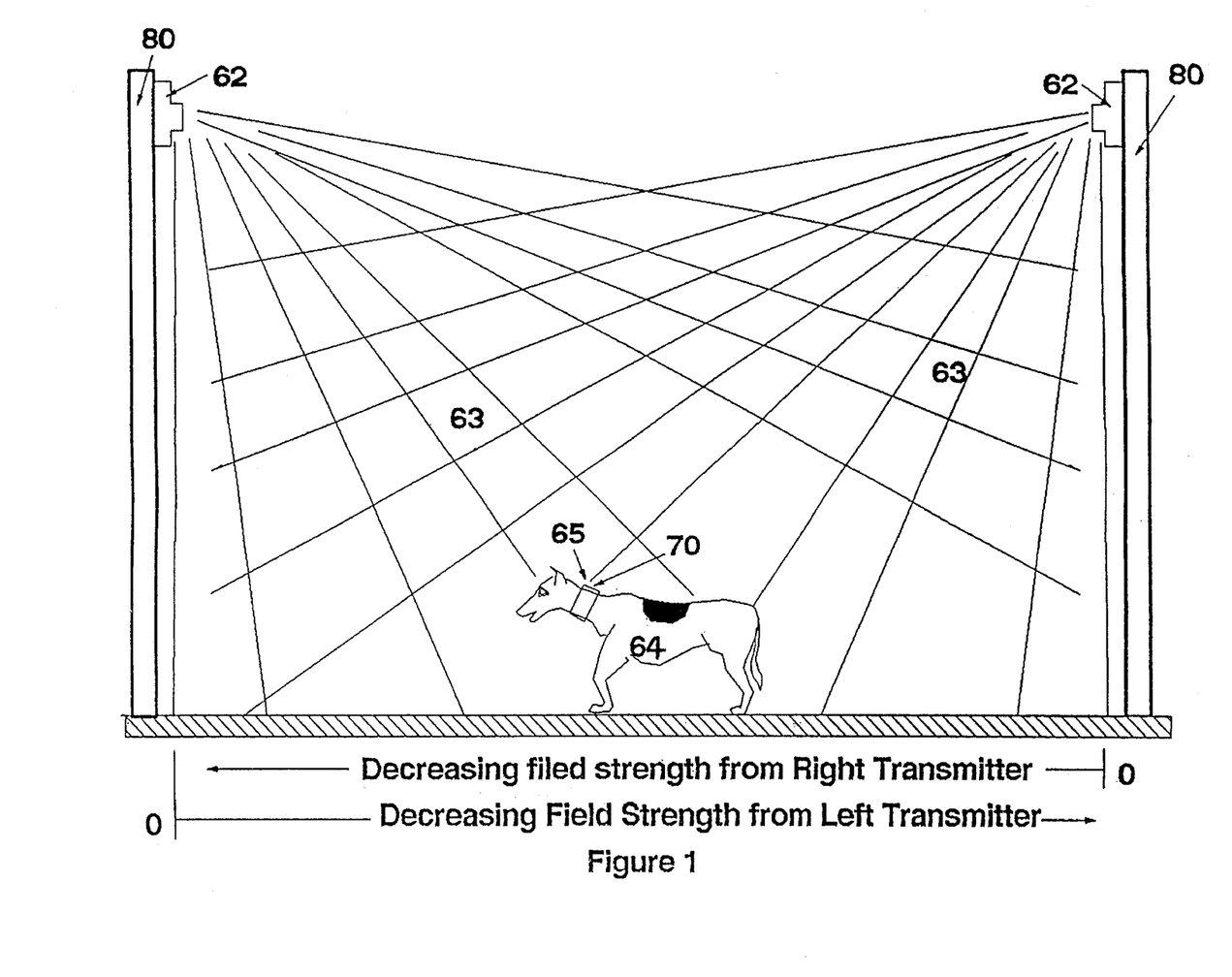
FIG. 1 is a side view of the animal containment system made in accordance with the teachings of the present invention.
Figure 2:
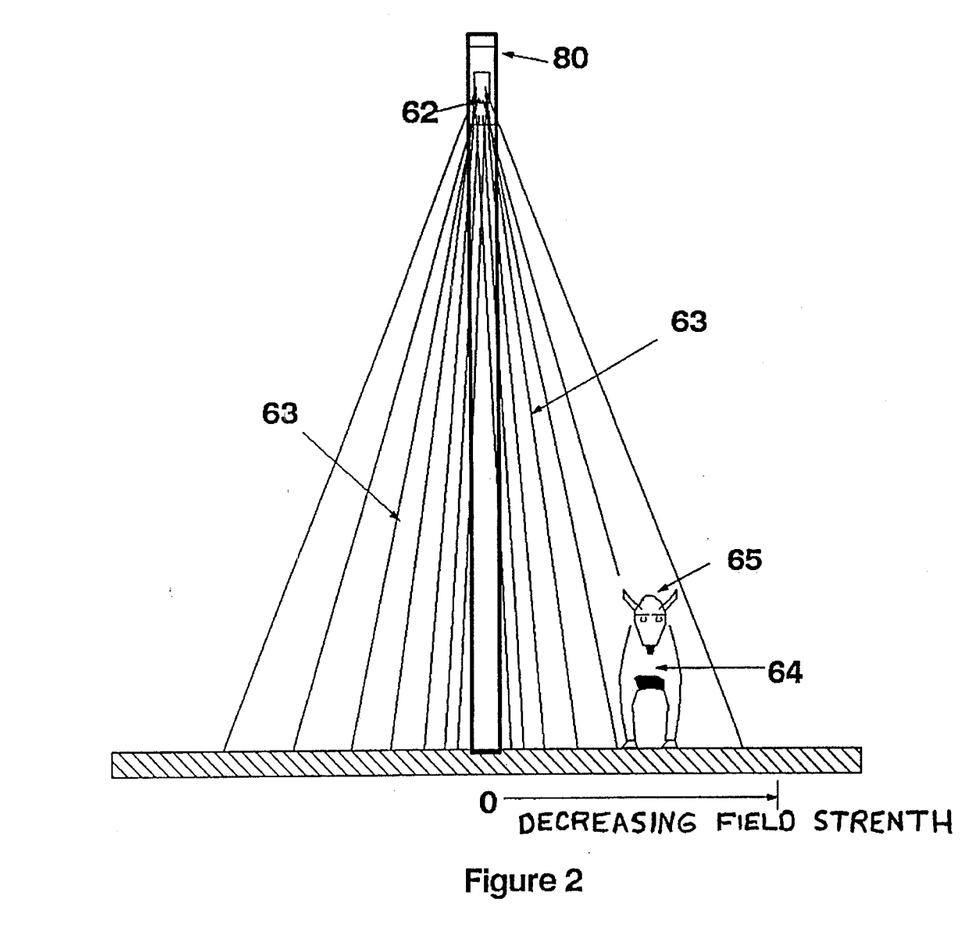
FIG. 2 is front view of the animal containment system shown in FIG. 1.

An application example would consist of one or more stationary transmitters 62 as shown in FIGS. 1 and 2. The transmitters 62 send a linear curtain of energy (decreasing in intensity from the focal line) 63, encoded with a command along a boundary or perimeter. A moving or fixed receiver 65 attached to a conveyance 64, such as a domesticated animal to be contained, receives and converts the linear energy back into an electronic signal decoded to present information. The beam 63 extends a curtain along a border or boundary. The transmitter(s) can be hand held or they can be mounted on suitable posts (for outdoor applications) or walls (for indoor applications) 80. The animal will be in continual communication with the transmitter (the animal wears a collar 70 which presents one or more receivers) so long as the animal is within the curtain of the transmitted linear energy beam. The communication occurs with no physical connection or wiring between the transmitter 62 and the animal 64.

Figure 3:
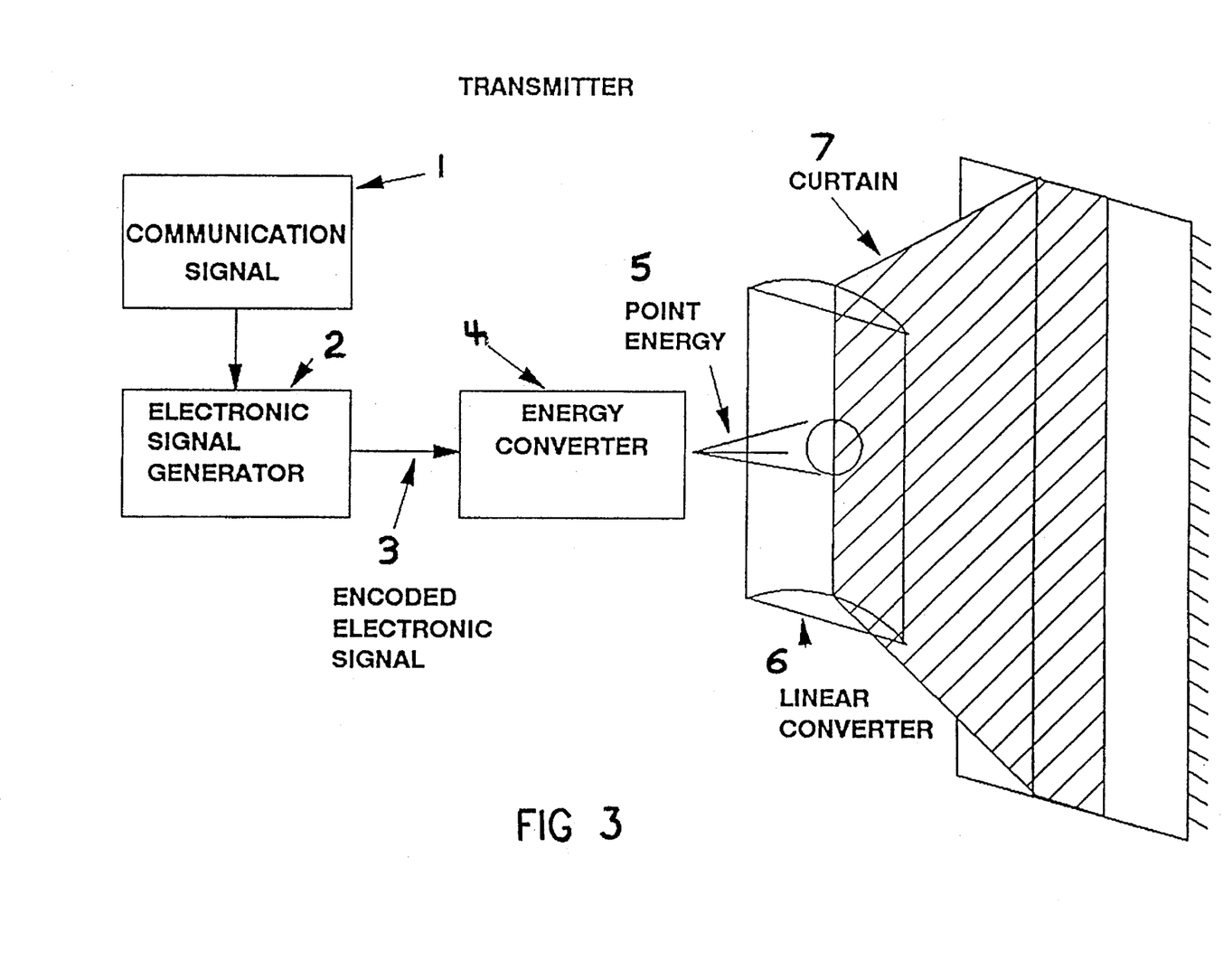
FIG. 3 is a block diagram illustrating the transmitter of the animal containment system.
Figure 4:
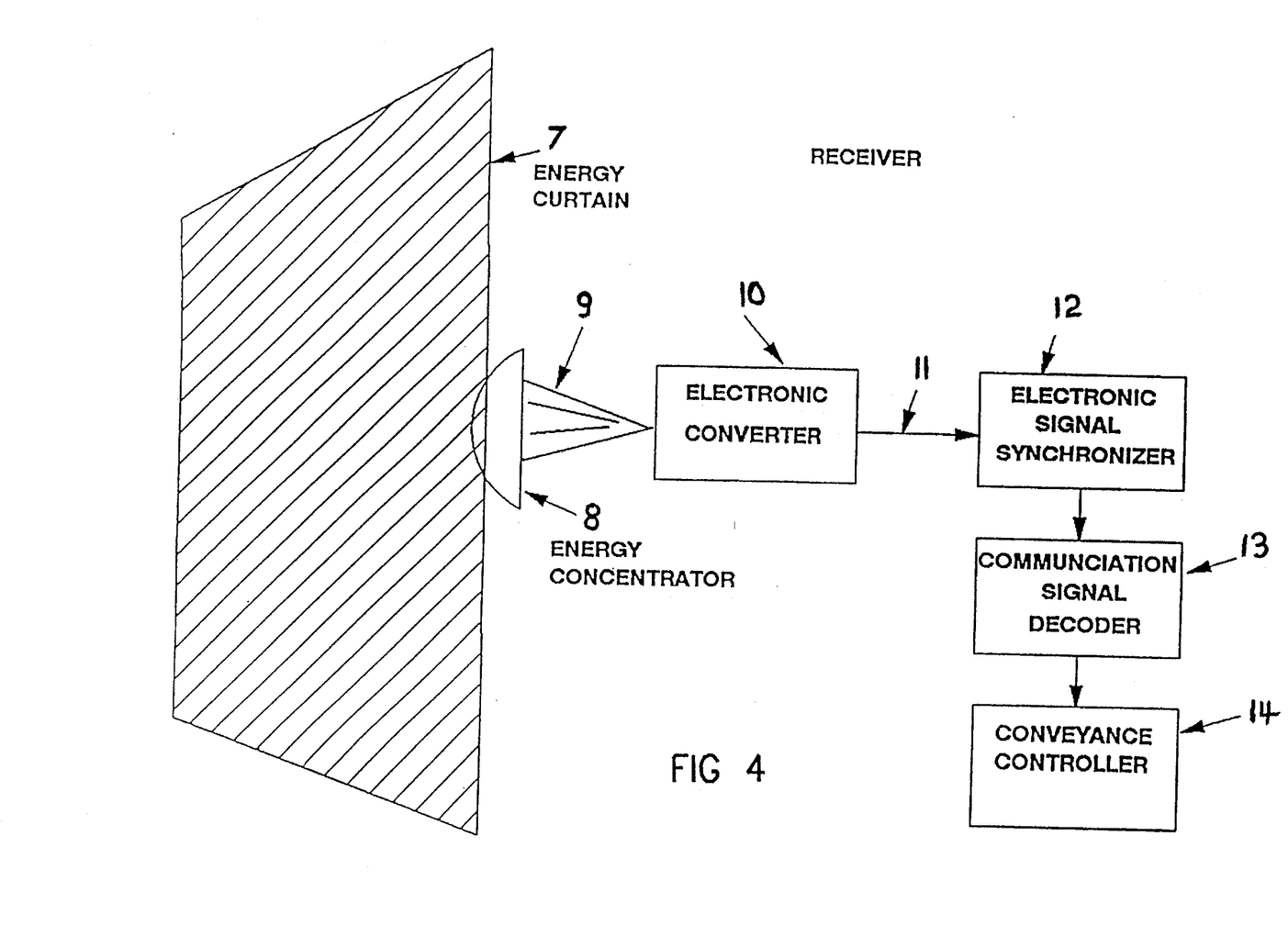
FIG. 4 is a block diagram illustrating the receiver of the animal containment system.

Referring to FIG. 3, the block diagram of the transmitter 62, the communication signal 1 contains the information which is to be transmitted through the transmitter 62. This communication signal is integrated with the electronic signal generator 2 which results in an electronic encoded signal 3. This electronic encoded signal drives the energy converter 4, which generates a point source of encoded energy 5; this encoded energy immediately begins to disperse omni-directionally from its point source. It is now intercepted by the linear converter 6, which focuses the rapidly dispersing energy into a narrow line of encoded energy which may be directed along a prescribed curtain 7. A receiving device 65 either moving or stationary within the curtain of energy may now detect the encoded energy. This will only occur within the energy curtain. The block diagram of the receiving device, shown in FIG. 4, includes an energy concentrator 8 which will focus the linear energy into a point source 9. The point source of energy is focused onto an electronic converter 10 which converts the energy into an encoded electronic signal 11. The electronic filter and comparator 12 rejects unwanted signals and converts low level received signals to logic level signals. Upon recognizing the specified signal the signal is decoded by the communication signal decoder 13, and is transferred out to the conveyance (animal) controller, 14. The conveyance controller will convert the signal into an instructional command to the animal. This instructional command may take several forms, such as varying audible tones, electrical shock, or other instructional instruments.

Figure 5:
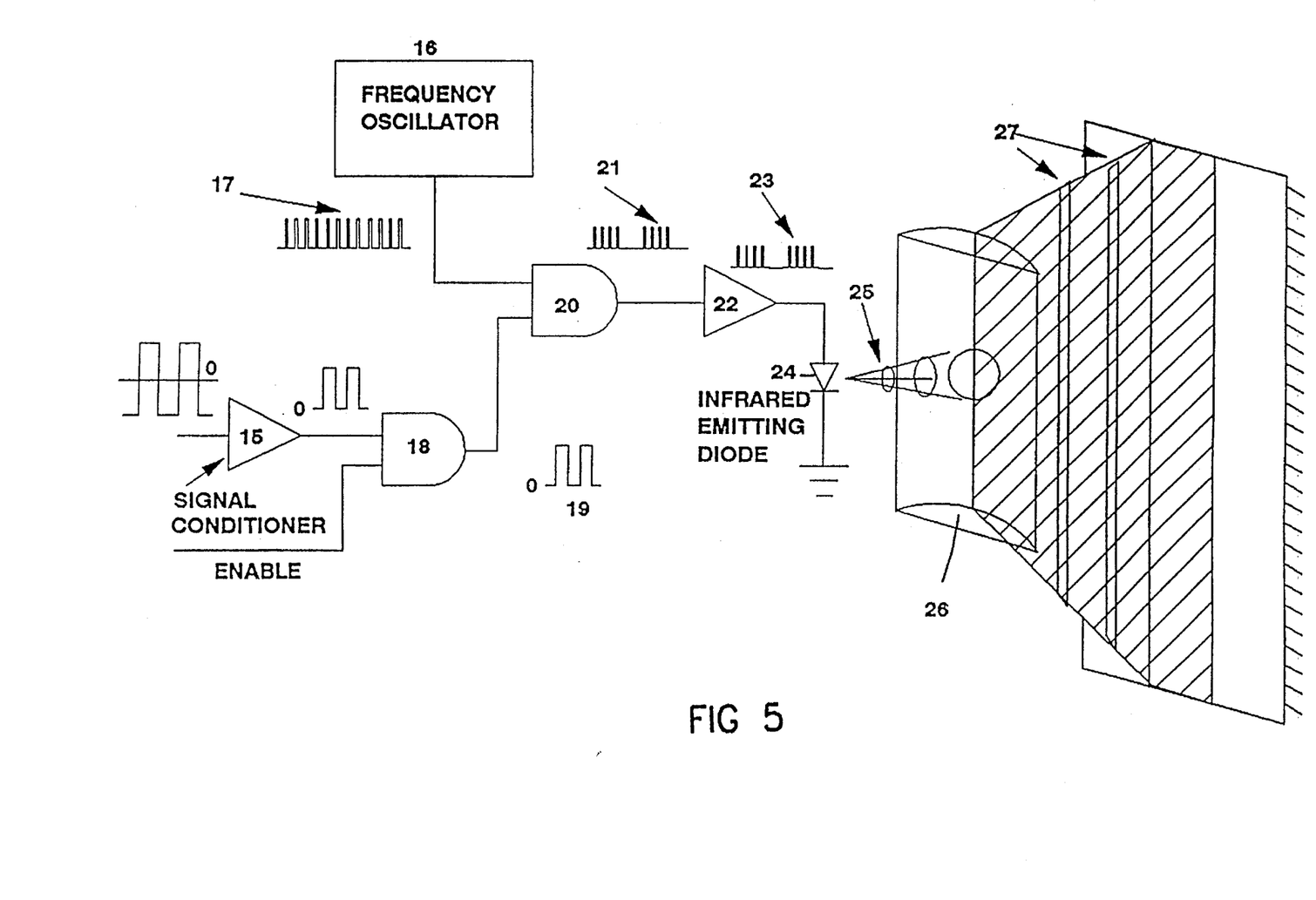
FIG. 5 is a block diagram of a transmitter for transmitting infrared optical energy.

The energy utilized can be anywhere within the frequency spectrum which could include, but is not limited to, audio, visible light, laser light, infrared, microwave, etc. Certain energy frequencies are better suited for individual applications. Near infrared optical energy (800 to 1000 nanometers) is very well suited for this environment. An infrared transmitting application is shown in FIG. 5. The incoming data signal is conditioned through a signal conditioner 15, and allowed to pass through "and" gate 18 only when enabled by an external signal (switch). The data signal 19 enables the higher frequency signal 17 which was generated by the frequency oscillator 16. Data pulses of encoded frequency 21 which issue from gate 20 enter the current driver 22, which provides the encoded electrical signal 23 of sufficient current to drive the infrared emitting diode 24. This provides sufficient current to generate the infrared energy pulses 25 corresponding to the encoded electrical signal. These infrared data pulses enter the cylindrical lens 26 which converts the omni-directional energy pulses into linear energy pulses 27. The linear energy pulses are transmitted along the direction of a defined corridor.

Figure 6:
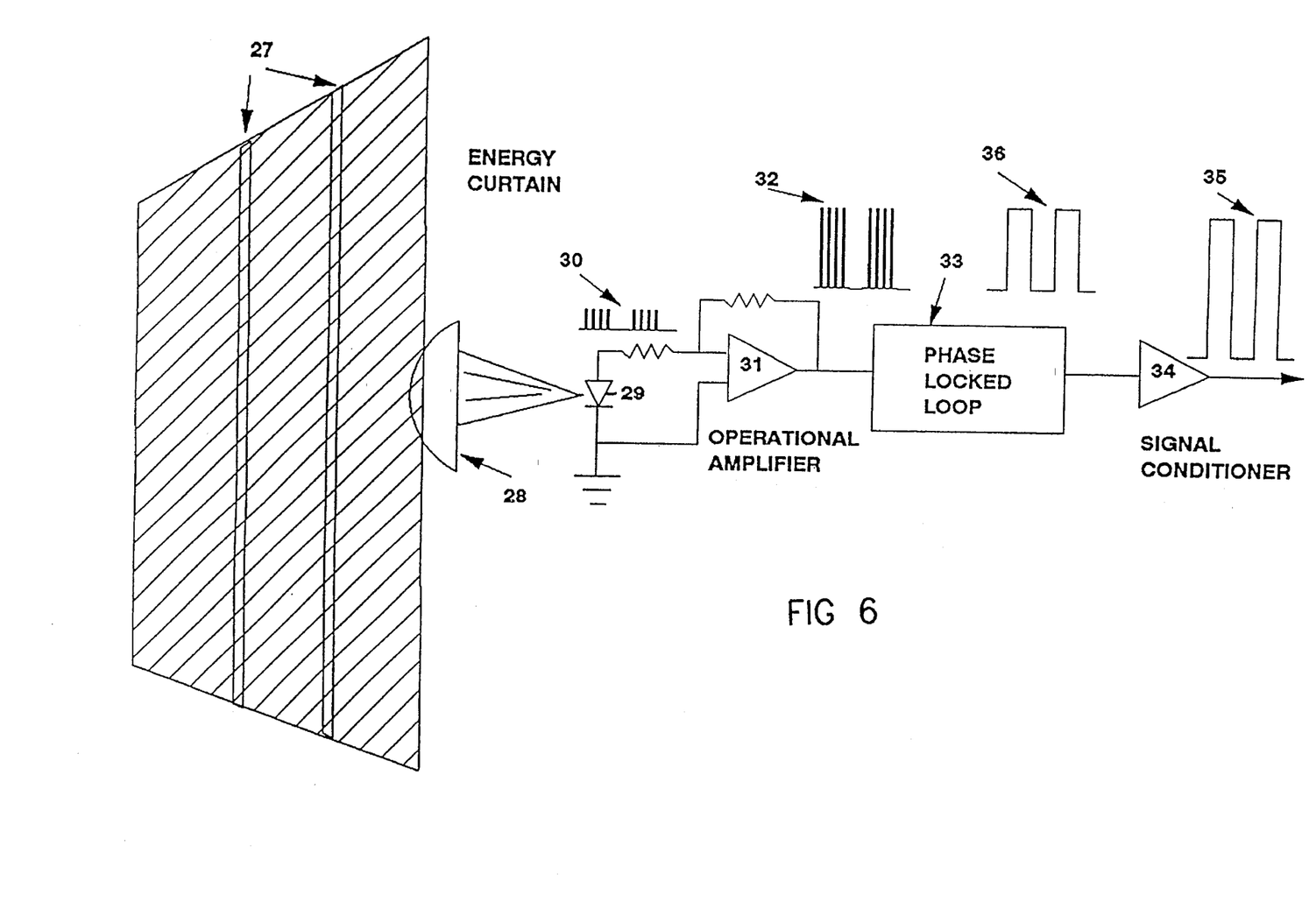
FIG. 6 is a block diagram of a receiver for receiving infrared optical energy.

The infrared receiver shown in FIG. 6 may be either moving or stationary within the corridor, and receives the linear energy pulses 27. The lens 28 focuses the linear energy onto the infrared receiving diode 29. This then generates an electrical signal 30 of the encoded data. The encoded electrical signal is amplified by the operational amplifier 31 into a useable electrical signal 32 which enters the decoding circuit 33, which is synchronized to the originally generated and transmitted frequency from the frequency oscillator 16. This circuit results in decoded pulses 36 which correspond to the original data from the signal generator 15. These decoded data pulses are conditioned by a signal conditioner 34, and the conditioned pulses 35 are converted into instructional commands to the animal. The linear energy curtain may be applied to contain animals within a prescribed boundary. This includes keeping the animals away from restricted zones. This would form a continuous curtain of invisible linear energy at a perimeter or boundary. Any linear energy receiver entering the curtain (corridor) of the linear energy would be subject to the instructional command. The linear energy curtain would transmit a continuous signal within its curtain.

Figure 7:
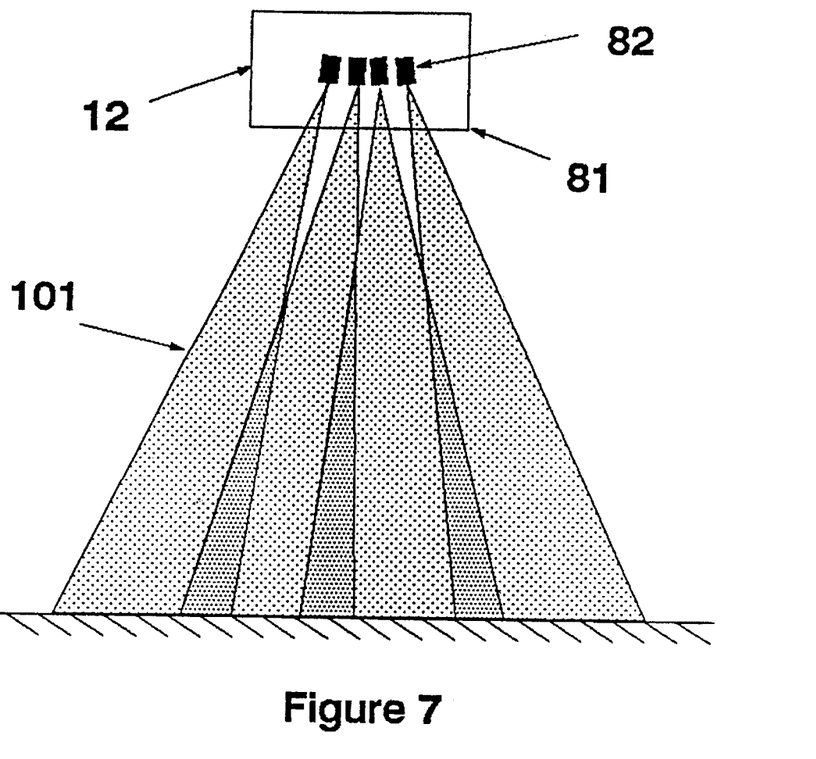
FIG. 7 is a side view using array optics to define a single energy curtain
Figure 8:
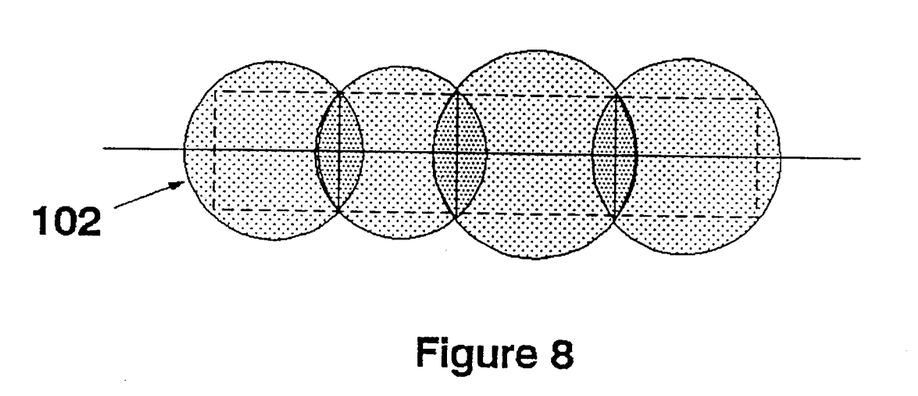
FIG. 8 is an overhead view of the system shown in FIG. 7.

As shown in FIGS. 7 and 8, a curtain could be defined by a linear array of point sources in the form of LED devices 82. Each LED 82 emits energy substantially in the form of a cone 101 which defines an angle about its axis. By tilting the LED's these conical energy cones can be overlapped to define the desired vertical wall or curtain 102.

Figure 9:
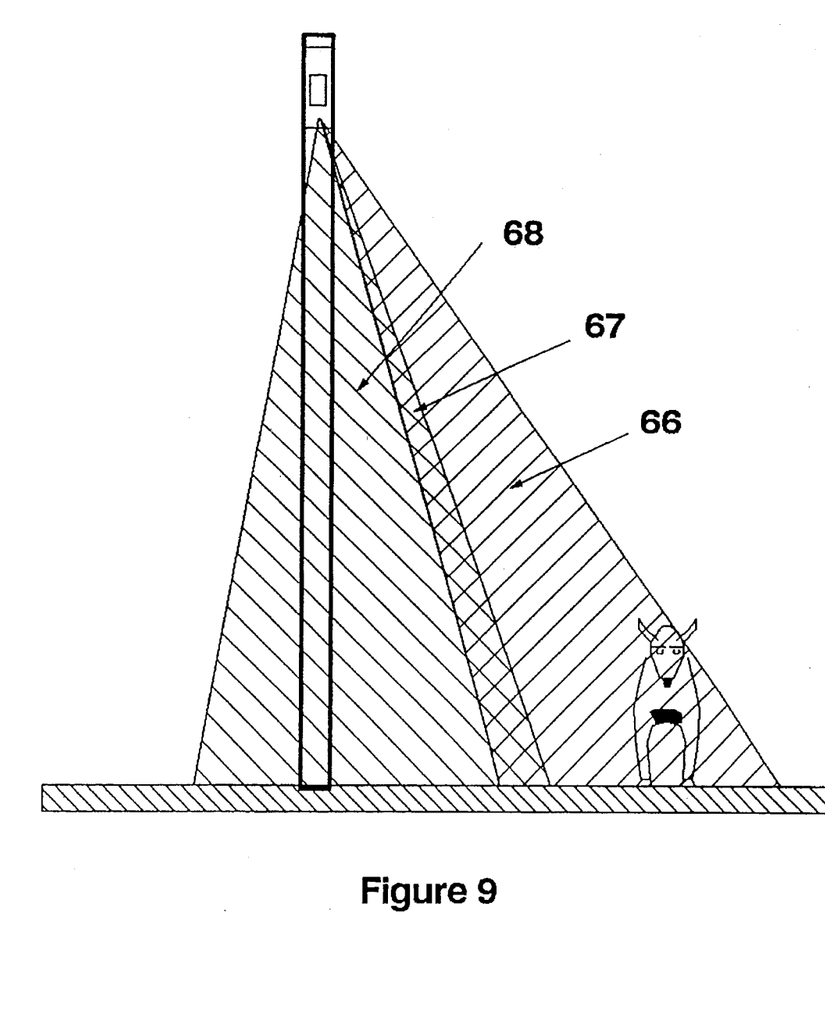
FIG. 9 is a front view of an animal containment system showing the overlapping of two linear energy curtains.

Two curtains 66, 68 could be transmitted side by side and possibly overlapping defining a third curtain having both codes to provide different instructional commands to the animal. This is shown in FIG. 9. In this configuration two linear energy transmitters would be employed to transmit two different energy curtains containing two different codes. The receiver located on the conveyance (animal) would be capable of receiving and decoding both codes. As the animal entered the first curtain 66, this signal would be decoded, and the appropriate instructional command (an audible tone, for example) issued to the animal. As the animal entered the overlapping curtains corridor 67, two codes would be received and decoded. The animal would receive a second and perhaps different instructional command. As the animal proceeded to the corridor occupied solely by the second curtain 68, the animal would then receive an additional instructional command (an electrical shock, for example). The instructional commands would be selected to best deter the animal from entering and going through the boundary. Having the two curtains adjacent but not overlapping simplifies the electronics since only one code will be present in each curtain.

In a similar manner, a plurality of transmitters and linear energy curtains may be employed to provide a plurality of instructional commands.

The electronics within the receiver would be capable of receiving all the signals provided by the transmitters and subsequently converting these signals into the desired instructional commands. The instructional commands therefore would vary depending upon the relative position of the receiver (animal) to the boundary established by the linear energy curtains.

Most types of radiated energy can be utilized for this function. However, near infrared energy offers a very safe and practical frequency range for this specific requirement. Electronic signals are generated which contain the code to be transmitted. These electronic signals are converted to infrared utilizing electronic devices manufactured for the purpose. The infrared energy generated begins to disperse until it contacts the cylindrical optical lens which linearizes the energy into line which disperses into a plane or curtain. The shape and size of the curtain is established by design. The infrared energy curtain is focused onto a prescribed boundary, thus generating the linear energy only where desired. Any receiving device within the curtain only may receive the coded energy signals. These signals are decoded to provide an instructional command to the animal, warning it to remain within the prescribed boundary. This provides a new and unique method of establishing perimeter for animal control.

Figure 10:
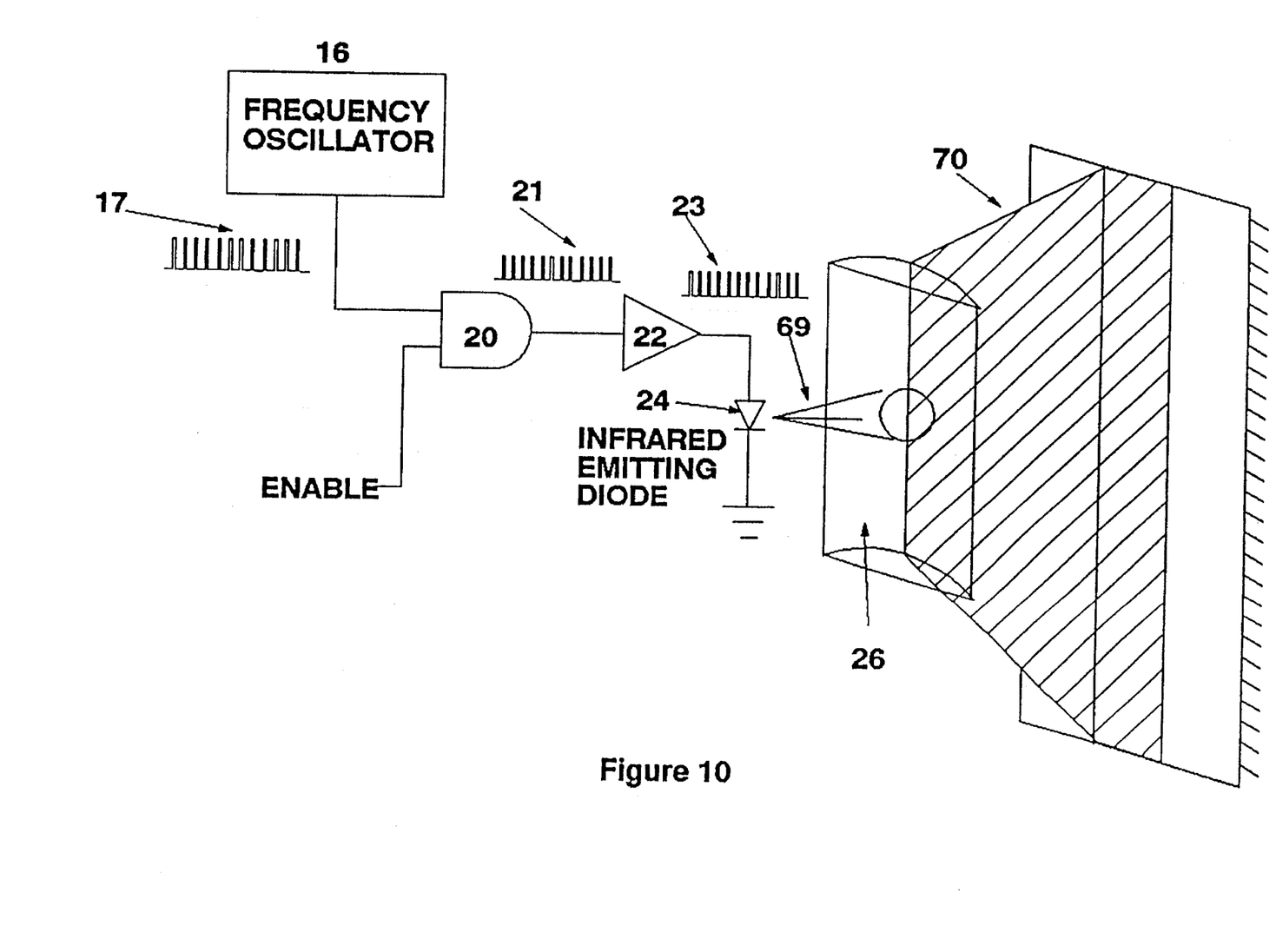
FIG. 10 is a block diagram illustrating the transmission of infrared optical energy where the wave length is the code.

In addition to encoded infrared transmitted signals, the basic infrared optical energy could also be utilized as a means for establishing an invisible curtain as shown in FIG. 10. The absence and presence of the infrared energy of a specific wavelength (the code) could be detected by the receiver on the collar as an indication that the animal is within the invisible curtain field, and a subsequent instructional command could be issued to the animal.

The intensity of the field decreases as the field disperses from the lens, 26. Optionally, circuitry in the collar could be devised which would sense the change in field strength as the animal moves into and through the field towards the boundary. This change in magnitude of the field strength would be detected and an appropriate instructional command could be issued to the animal in direct relationship to the magnitude of the field strength. Multiple fields could be transmitted utilizing multiple circuitry. Each field would have unique data characteristics.

For the infrared field of FIG. 10, where the frequency is the code, a second infrared field of different wavelength from the first would be transmitted. This second infrared field would be of a unique infrared wavelength from the first field. A second circuit would transmit through a different infrared emitting diode 24, which would transmit a different infrared wavelength through the same or separate optics 26. The receiving collar would have circuitry and optics included which would detect both of the unique infrared energy fields and be capable of distinguishing between the two. An appropriate instructional command would be issued to the animal for each of the fields that it enters. Likewise, a plurality of fields may be transmitted and received.

The contour of this energy and the resulting projections may be established as discussed below.

Refraction Optics

Figure 11:
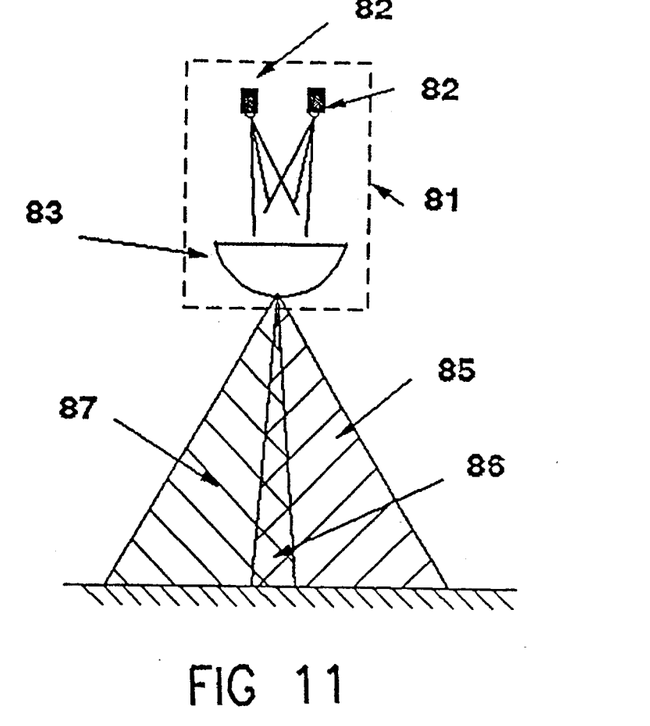
FIG. 11 is a front view of an animal containment system establishing two overlapping energy curtains with the use of refractive optics.

Referring to FIG. 11, the infrared energy generated within transmitter 81 by the point energy sources 82 begins to disperse until it contacts the cylindrical optical lens 83 (shown in edge view) which linearizes the conically shaped (omnidirectional) energy from each point source into a wedge which disperses into a plane or curtain. The shape and size of the curtain is established by design of the length and focal length of the lens. The length, width, and overlap of the energy are established by design, and are established into two or three separate zones. The zones are defined as 85—the first warning zone, 86—a second optional warning zone and 87—the correctional zone. The infrared energy curtain is focused onto a prescribed boundary, thus generating the linear energy only where desired.

Reflection Optics

Figure 12:
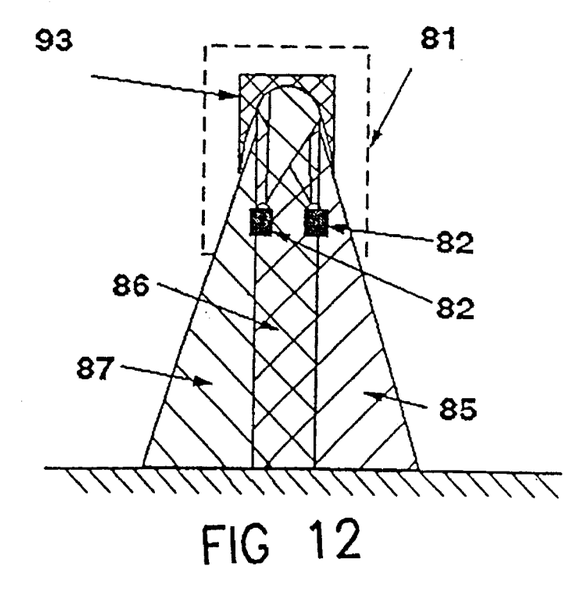
FIG. 12 is a similar view using reflective optics.

Referring to FIG. 12, the infrared energy generated within transmitter 81 by a point energy source 82 begins to disperse until it contacts the reflective mirror 93 (shown in edge view) which focuses or linearizes the energy from a conical shape into a wedge which disperses into a plane or curtain. The shape and size of the curtain is established by design of the length and focal length of the mirror. The length, width, and overlap of the energy are established by design, and are established into three separate zones. The zones are defined as 85—the first warning zone, 86—an optional second warning zone and 87—the correctional zone. The infrared energy curtain is focused onto a prescribed boundary, thus generating the linear energy only where desired.

Masking Optics

Figure 13:
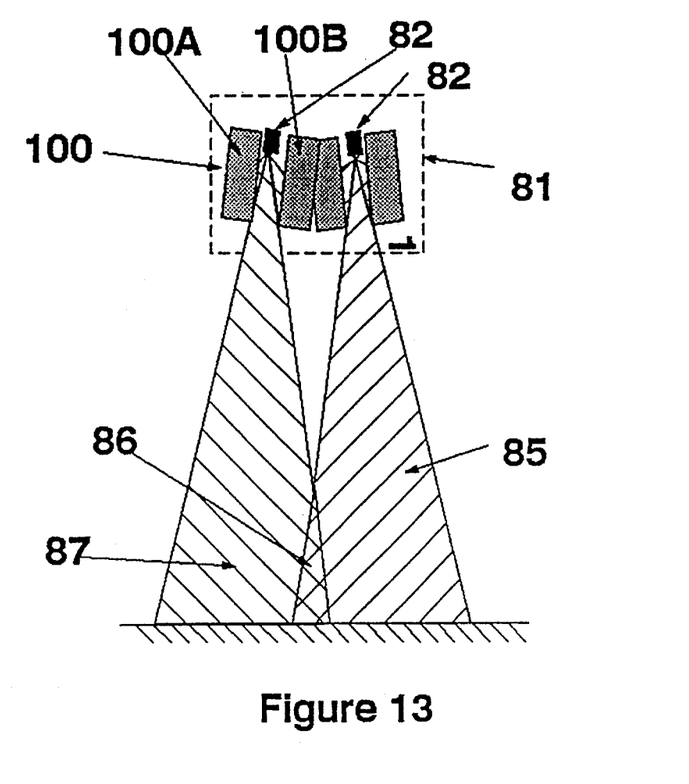
FIG. 13 is a similar view using a first embodiment of masking optics.

Referring to FIG. 13, the infrared energy generated within each transmitter 81 by a point energy source 82 begins to disperse until it contacts the mask 100, (shown in edge view) which masks the conical shape of the energy so that further dispersion is in the form of a substantially rectangular wedge which disperses into a plane or curtain. In the embodiment shown in FIG. 13, each mask 100 has an inner portion 100A which truncates one side of the conical energy form and has an outer portion 100B which truncates the opposite side of the conical energy form. A curtain which is substantially rectangular in cross section is thereby defined. By so masking the two sources, the curtains 85, 87 containing the warning and instructional commands can be separated and if desired, a third intermediate curtain 86 having both codes can be defined. The shape and size of the curtain is established by the geometrical design of the length, width and placement of the point energy sources 82 within the mask. The length, width and overlap of the energy are established by design and are established into three separate zones. The zones are defined as 85—the first warning zone, 86—a second warning zone and 87—the correctional zone. The infrared energy curtain is masked to establish a prescribed boundary, thus generating the linear energy only where desired.

Figure 14:
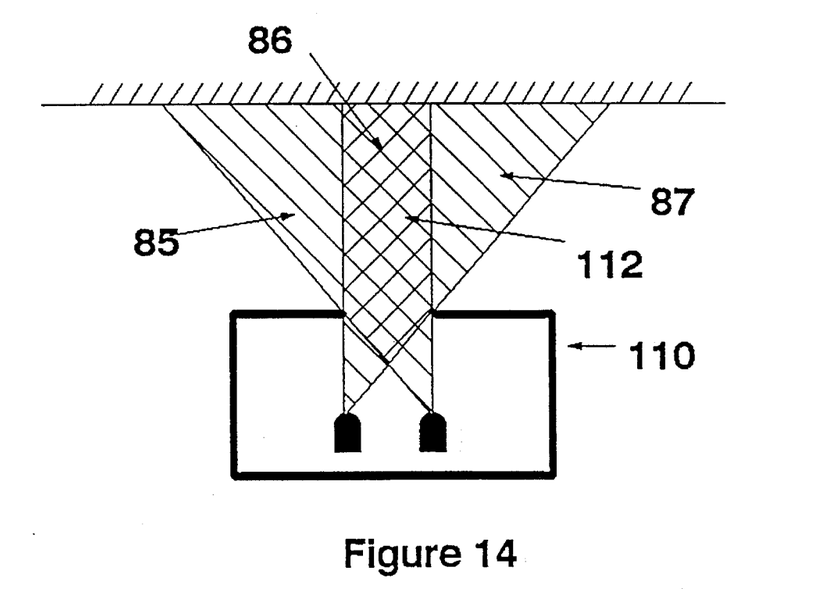
FIG. 14 is a view similar to that of FIG. 11 illustrating a second embodiment of masking optics.
Figure 15:
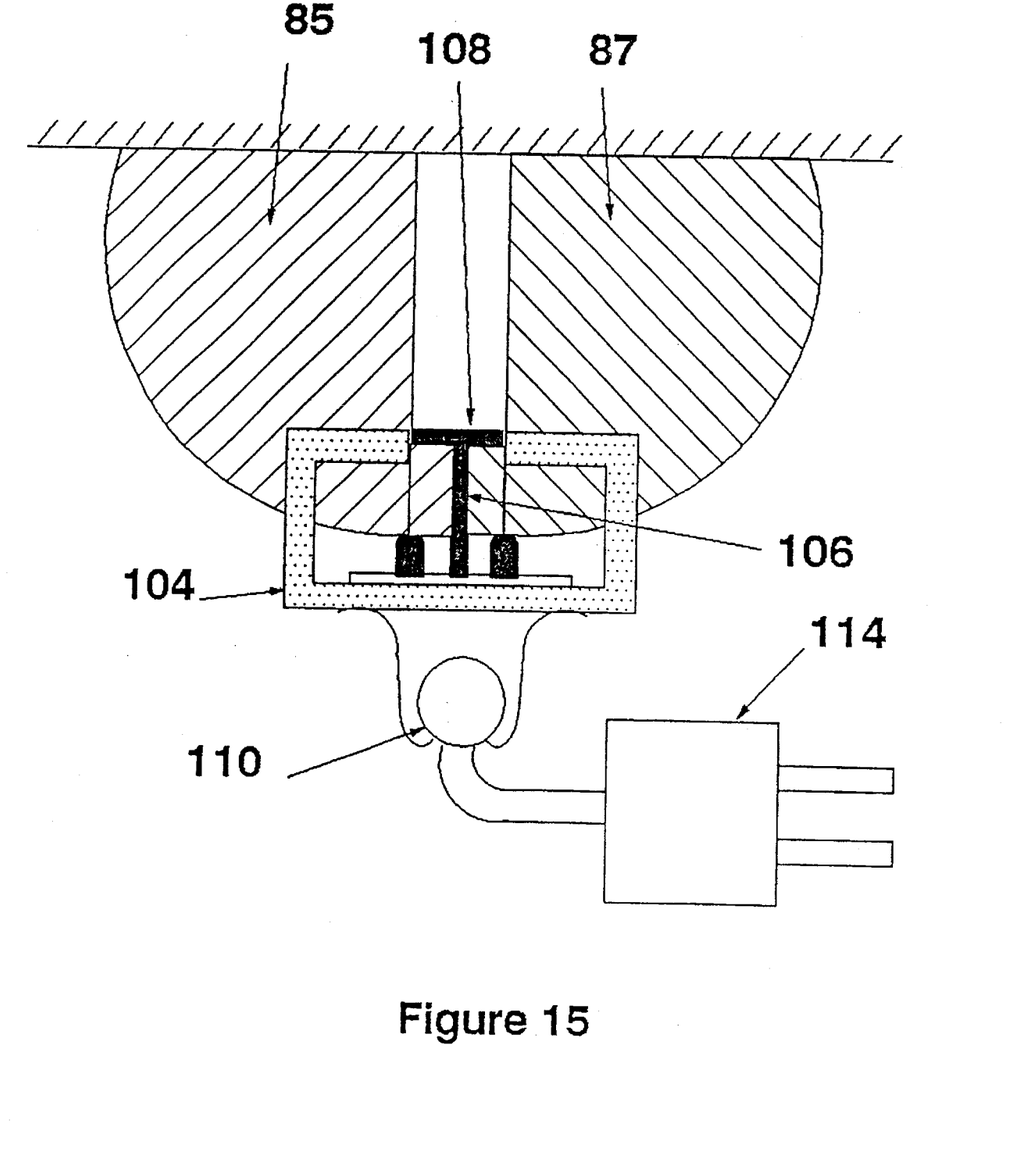
FIG. 15 is a view similar to that of FIG. 14 illustrating a third embodiment of masking optics.

A second masking embodiment is shown in FIG. 14. Here the masking is external in the form of a closed box 110 having a slit 112 formed so that warning 86 and instructional 88 curtains are separated by a third curtain 87 containing both codes. In FIG. 15 the box 104 is made from a transparent material such as clear plastic and an internal mask having an outwardly projecting portion 106 and a transverse portion 108 at the outer end thereof is used to define adjacent, separated warning and instructional curtains. This embodiment is ideally suited to project the curtains from the side, as would be the case if the housing included a universal joint connection 110 to a supporting piece 112, which could be inserted into a wall plug 114 to provide the required power. By reducing the width of the transverse portion and, if necessary, shortening the outwardly projecting portion, a third (two code curtain) could be defined between the warning and instructional curtains.

Figure 16:
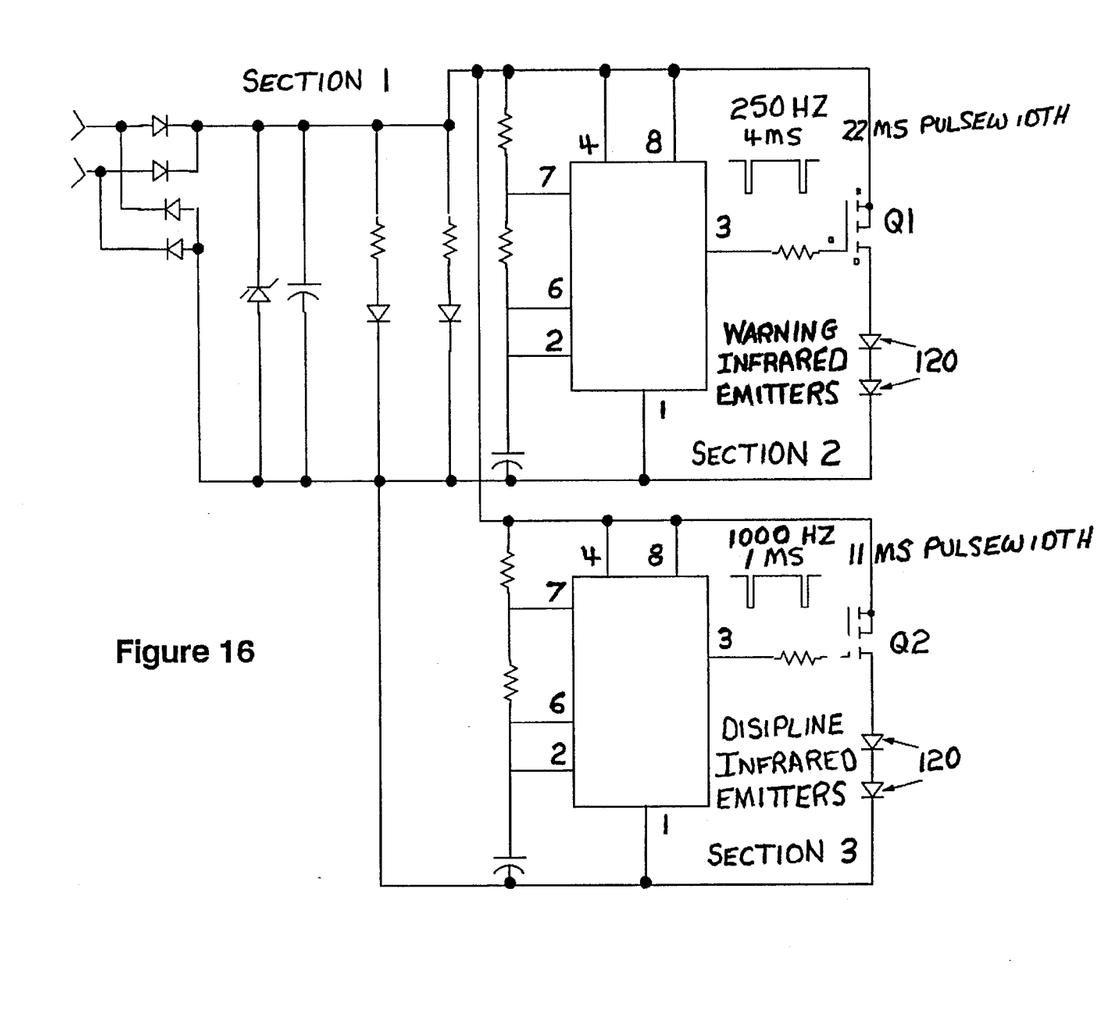
FIG. 16 is an electronic diagram illustrating a transmitter having a preferred embodiment.

The transmitter circuit shown in FIG. 16 is comprised of three circuit sections.

Section 1

The first section limits the input power voltage, filters the input voltage and rectifies the input voltage. It also contains two visible light LED's, one red and one yellow, which are located in the assembly adjacent to the LED's generating one curtain. This will give guidance to the installer adjusting the mounting of the transmitter. This first circuit is comprised of four diodes, one capacitor, two LED's and one Zener diode.

Section 2

The second circuit section is a standard oscillator which turns on a power FET to enable high current pulses 22 microseconds wide with a repetition rate of 250 Hz to pass through a number of series connected infrared emitting diodes 120. While two are shown, three or more may be preferable. The emissions from these diodes form the infrared warning signal and establish through its packaging the area in which the receiving device on the collar will cause the receiver's buzzer to sound continuously.

Section 3

Circuit section three is identical to section two except that the timing components on the oscillator result in an output pulse that causes its infrared emitters 120 to be on for 11 microseconds with a repetition rate of 1000 Hz. When this signal is received by the collar it will result in the animal receiving a disciplinary action.

Figure 17:
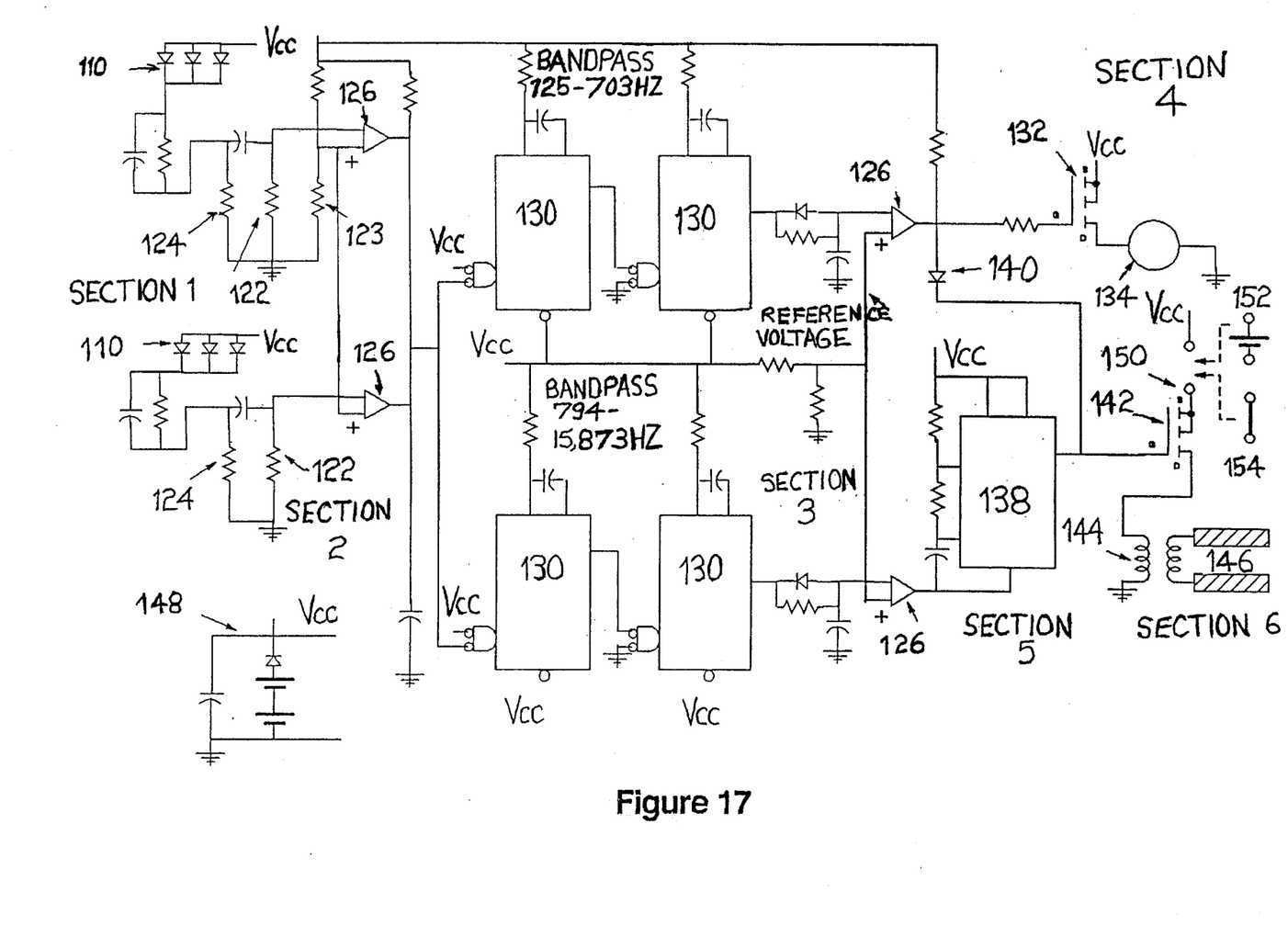
FIG. 17 is an electronic diagram illustrating a receiver having a preferred embodiment.

The receiver circuit shown in FIG. 17, which is mounted in the dog collar assembly, is comprised of six basic sections.

Section 1

Section 1 is comprised of two spaced sets of infrared receiving diodes with each set containing typically three infrared diodes connected in parallel. These diodes which are visible light filtered and have a built-in wide angle lens may be disposed to accept energy from opposite aspects of the conveyance and may be tilted to better cover a variety of angles for receiving the coded energy.

Section 2

Section 2 is comprised of two identical RC circuits which reduce current consumption when the receiver is not within a coded infrared energy zone. This RC circuit acts as a current limiting, very high impedance to DC or low frequency infrared energy that might be received in non-coded form such as sunlight or 60 HZ infrared from artificial lighting. It is comprised of two identical highpass RC filter circuits 122 (one filter circuit for each set of receiving diodes) and signal threshold detection logic. The filters use passive components to perform the functions of a first order high-pass filter. The purpose of these filters is to eliminate the 60 Hz and 120 Hz sinusoidal infrared components associated with ambient indoor lighting. These two filters are preceded in the circuit by a resistor 124 which is in series with the infrared receiver diodes and ground. This resistor provides a current path across which to generate a voltage which is representative of the intensity of the input infrared signal. The two signals that are used for detection are as follows. The warning zone signal is a 22 microsecond pulse which occurs at a repetition frequency of 250 Hz. The discipline or shock signal is detected by the reception in the receiving diodes of a signal that is a 11 microsecond pulse which occurs at a repetition rate of 1000 Hz. The RC filter should actively pass the legitimate warning and discipline signals with minimal attenuation because their virtually square wave shape causes them to appear as the timing equivalent of a high frequency sine wave (approximately 18000 Hz). The outputs of these first order filters are put into comparators 126 and when the infrared signal exceeds the predetermined threshold established for the comparator by resistors 128 the output of the comparators goes low. The two outputs of the comparators are connected so that if a signal is detected at either one, it will be passed onto the next circuitry section as a logic low signal level for roughly 22 microseconds (warning) or 11 microseconds (discipline). Essentially, the comparators convert a very low level input event to typical logic levels for processing by subsequent electronics and hence, function as a signal conditioner set to the very low threshold at which the output of the receiving LED's are supplied to the rest of the circuitry. The comparator is extremely sensitive and can detect very weak signals.

Section 3

Section 3 is comprised of two frequency range detectors. It is comprised of two structurally identical digital filter circuits with different timing components. Each digital filter circuit is comprised of successive one shots 130 followed by an RC smoother or integrator and a comparator 126. The digital filter circuit which has a bandpass of from 125 to 703 Hz will only detect the presence of a warning signal. The warning signal will be detected even where asynchronous warning signals are simultaneously received from two different transmitters. The digital filter circuit which has a bandpass of from 794 Hz to 15,873 Hz will detect the presence of a discipline signal and will detect that signal even where asynchronous disipline and warning signals are simultaneously received from two different transmitters.

Each digital filter functions in two stages. If the input frequency is sufficiently high to retrigger the first stage before it times out, its output will always remain high and not allow the input pulse to be transmitted on to the next stage. Thus the first stage eliminates frequencies above the desired pulse rate to be detected. The second stage of each filter is also a one shot whose output will go low if the repetition rate at its input is not high enough to retrigger it prior to it timing out. Each succeeding circuit with the diode assures that spurious events are rejected and when coupled with the comparator will indicate by the comparator output going low that the input signal falls within the acceptable frequency band and represents a legitimate warning or instructional signal. The diode causes the integrator discharge time constant to be shorter than the charge time constant.

Section 4

This section is comprised of a transistor 132 enabled sounder 134 which provides a continuous warning tone whenever the warning zone is occupied. The preferred sounder which is sold by Intervox (P/N BRT1209P-06-C) will operate when a voltage in excess of 4.5 volts is applied. This sounder is enabled when the output of the warning zone digital filter (comparator 126) is low.

Section 5

Section 5 is comprised of an oscillator 138 which is enabled by the output of the digital filter which detects when the penetration of the discipline or shock zone occurs. The output of the oscillator, a repetitive changing between high and low state, has two consequences. Diode 140 forces the output of the warning signal comparator 126 to correspond to the output of the oscillator 138. As a result, when the animal is in the discipline zone, the sounder buzzer 134 will be operated in a noncontinuous (intermittent) manner, i.e., the sounder will have a repetitive cycle with each cycle including a sounder on portion followed by a sounder off portion.

Section 6

Section 6 is comprised of a transistor 142 and a high turns ratio transformer 144 which will provide a high voltage but low energy shock, to a pair of animal engaging metal posts 146, at a rate which is controlled by the oscillator 138. The power supply is a six volt battery 148. A 1.5 volt battery receiving receptacle 150 is present in the transistor 144 line which can: 1. be left open whenever it is desired that the instructional/discipline signal not issue when the animal is in the instructional zone (the sounder will however operate intermittently at the oscillator rate); 2. be filled with a 1.5 volt battery 152 whenever the system user deires to increase the strength of the instructional/discipline signal and 3. be filled with a current conducting slug 154 when the lower magnetude instructional signal is sufficient. Since the sounder will only operate at a voltage above 4.5 volts, when the battery voltage reduces to this level, the sounder will chirp instead of sounding to inform the system user that the battery needs replacing. When the voltage drops below this 4.5 volt level the sounder will be quiet when the animal is in either the instructional/discipline field or in the warning field and this also will serve as notice that the battery needs replacement.

While cats and dogs wearing a receiver can be contained with the use of either the transmitter, this same technology has applicability for containing another special animal, i.e., man. To contain a person, who sleep walks, in his or her bedroom, a wrist band carrying a receiver can be worn by the sleep walker. The sleep walker can program the receiver to emit both signals or just the warning or instruction signal, and can select from the two intensities of the instruction signal.

Additionally, children in some controlled environments may wear such a receiver on a hat or the like, so that their behavior can be impacted with the use of the transmitter. Also in neighborhoods where fences are not permitted or desired this technology can be used to fence the child in.

We claim:

1. An animal confinement system comprising a transmitter for transmitting near infrared energy coded with pulses having first and second frequencies and a receiver to be worn by the animal for receiving the transmitted near infrared energy coded with said pulses having said first and second frequencies, said receiver including a sounder for producing a warning tone, transformer means for providing a high voltage low energy shock, first means for operating said sounder when near infrared energy is received coded with pulses having said first frequency, said operating means having first and second one shots defining a first digital bandpass filter, second means for operating said transformer means when near infrared energy is received coded with pulses having said second frequency, said second operating means having third and fourth one shots defining a second digital bandpass filter, said first bandpass filter being selected so that said pulses having said first frequency will be detected while said pulses having said second frequency will not be detected, and said second bandpass filter being selected so that said pulses having said second frequency will be detected while said pulses having said first frequency will not be detected.

2. An animal confinement system according to claim 1, wherein said first transmitted pulse frequency is 250 Hz, said second transmitted pulse frequency is 1000 Hz, said first received selected bandpass is 125–703 Hz, and said second received selected bandpass is 794–15,873 Hz.

3. An animal containment system according to claim 1, wherein said receiver receives said first and second frequencies from two transmitters, said first bandpass being selected so that only said first frequency will be detected even in the presence of asyncronous first frequencies, and said second bandpass being selected so that only said second frequency will be detected even in the presence of asyncronous first and second frequencies.

4. An animal containment system according to claim 1, wherein said first and second operating means each further includes light receiving diode means and an RC circuit for reducing current consumption when said diode means receives infrared energy which is not transmitted by said transmitters.

5. An animal confinement system comprising: a transmitter for transmitting a first code in one zone and a second code in an adjacent second zone, a receiver to be worn by the animal for receiving near infrared energy coded with said first and second codes, said receiver including a sounder, transformer means for providing a high voltage low energy shock, means for continuously operating said sounder when near infrared energy is received having said first code, said operating means including a first transistor, and a comparator having an output controlling the operation of said transistor, an oscillator having an output operating said transformer means when near infrared energy is received having said second code, and means for connecting the output of said oscillator to the output of said comparator for intermittently operating said sounder when near infrared energy is received having said second code.

6. An animal containment system according to claim 5, wherein said transformer means includes a second transistor controlled by the output of said oscillator means.

7. An animal containment system according to claim 6, wherein said transformer means further includes a pair of animal engaging metallic posts.

8. An animal containment system according to claim 6, further comprising a battery circuit for operating said transformer means including a first battery, a second battery receiving receptacle in said battery circuit, a current conducting slug selectively sized for placement in said receptacle and a second battery for placement in said receptacle so that said transformer means may 1. be disconnected by leaving said second battery receiving receptacle empty;

2. be powered by said first battery when said slug is placed in said receptacle; and 3. be powered by both batteries when said second battery is placed in said receptacle.

9. An animal containment system according to claim 6, further comprising a battery circuit connected to said second transistor, said circuit including battery, a second battery circuit interconnecting said second transistor to said battery means, said sounder selected to operate only at a voltage output of said battery means above a voltage indicative of a weak battery, whereby the failure of said sounder to sound will inform the system user that the battery means is weak.

* * * * *